United States Patent
Han et al.

(10) Patent No.: US 9,662,870 B2
(45) Date of Patent: May 30, 2017

(54) DISPENSING JIG AND DEVICES INCLUDING SAME

(71) Applicant: Xiaomi Inc., Beijing (CN)

(72) Inventors: Gaocai Han, Beijing (CN); Yuan Gao, Beijing (CN); Duo Xu, Beijing (CN); Xinhua Sun, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 14/977,081

(22) Filed: Dec. 21, 2015

(65) Prior Publication Data

US 2016/0207294 A1    Jul. 21, 2016

Related U.S. Application Data

(63) Continuation-in-part of application No. PCT/CN2015/078105, filed on Apr. 30, 2015.

(30) Foreign Application Priority Data

Dec. 26, 2014    (CN) .......................... 2014 1 0832172

(51) Int. Cl.
  *B29C 65/48* (2006.01)
  *B32B 37/12* (2006.01)
  (Continued)

(52) U.S. Cl.
  CPC ...... *B32B 37/0046* (2013.01); *B32B 37/1284* (2013.01); *F16B 11/006* (2013.01);
  (Continued)

(58) Field of Classification Search
  USPC ........ 156/247, 289, 391, 537, 538, 539, 556
  See application file for complete search history.

(56) References Cited

U.S. PATENT DOCUMENTS 5,443,703 A * 8/1995 Blitshteyn ............... B29C 59/10
                                                 204/164
5,715,099 A * 2/1998 Takemoto ................ G02B 7/02
                                                 156/293

(Continued)

FOREIGN PATENT DOCUMENTS

CN       102909156 A     2/2013
CN       202725451 U     2/2013
(Continued)

OTHER PUBLICATIONS

First Office Action (including English translation) issued in corresponding Chinese Patent Application No. 201410832172.5, issued May 3, 2016, 9 pages.
(Continued)

*Primary Examiner* — Sing P Chan
(74) *Attorney, Agent, or Firm* — Quarles & Brady LLP

(57) ABSTRACT

A dispensing jig and a device including the same are provided. The dispensing jig includes a jig body defining a positioning chamber which has an opening and is configured to position a first adhesive surface of a first object. The first adhesive surface is a surface of the first object to be adhered to a second adhesive surface of a second object. An anti-sticking layer is provided on each of an upper surface of a periphery of the opening facing the second adhesive surface and an inner circumferential wall surface of the opening.

20 Claims, 2 Drawing Sheets

(51) Int. Cl.
*B32B 37/26* (2006.01)
*B32B 43/00* (2006.01)
*B32B 37/00* (2006.01)
*F16B 11/00* (2006.01)
*B29C 65/78* (2006.01)
*B29C 65/00* (2006.01)

(52) U.S. Cl.
CPC .......... *B29C 65/48* (2013.01); *B29C 65/7802* (2013.01); *B29C 65/782* (2013.01); *B29C 66/0042* (2013.01); *B29C 66/1122* (2013.01); *B29C 66/474* (2013.01)

(56) References Cited

U.S. PATENT DOCUMENTS

| | | | | |
|---|---|---|---|---|
| 5,864,437 | A * | 1/1999 | Takemoto | G02B 7/02 156/293 |
| 6,524,433 | B2 * | 2/2003 | Sweeney, Jr. | B60J 1/005 156/108 |
| 7,473,096 | B2 * | 1/2009 | Cinader, Jr. | A61C 7/146 433/24 |
| 2002/0134489 | A1 * | 9/2002 | Sweeney, Jr. | B60J 1/005 156/108 |
| 2007/0298364 | A1 * | 12/2007 | Cinader, Jr. | A61C 7/146 433/3 |
| 2009/0188099 | A1 | 7/2009 | Keyser et al. | |

FOREIGN PATENT DOCUMENTS

| | | |
|---|---|---|
| CN | 103831213 A | 6/2014 |
| CN | 103847216 A | 6/2014 |
| CN | 104525445 A | 4/2015 |
| CN | 204380944 U | 6/2015 |
| EP | 2 135 736 A1 | 12/2009 |
| FR | 2268654 A1 | 11/1975 |
| KR | 20-2012-0000426 U | 1/2012 |
| TW | 201425040 A | 7/2014 |

OTHER PUBLICATIONS

European Search Report issued in corresponding European Patent Application No. EP 15 20 2351, completed May 9, 2016, 2 pages.
International Search Report (including English translation) issued in corresponding PCT Application No. PCT/CN2015/078105, mailed Sep. 24, 2015, 6 pages.
Written opinion (including English translation) issued in corresponding Korean Patent Application No. 10-2015-7020117, mailed Sep. 30, 2016, 11 pages.

* cited by examiner

DISPENSING JIG AND DEVICES INCLUDING SAME

CROSS-REFERENCE TO RELATED APPLICATIONS

This application is a continuation-in-part application of International Application No. PCT/CN2015/078105, filed with the State Intellectual Property Office of P. R. China on Apr. 30, 2015, which is based on and claims priority to Chinese Patent Application No. 201410832172.5, filed on Dec. 26, 2014, the entire contents of which are incorporated herein by reference.

FIELD

The present disclosure relates to a technical field of jigs, and more particularly, to a dispensing jig.

BACKGROUND

Currently, in order to bond two objects, a dispensing jig is usually used to position an object thereof, to facilitate the bonding of the object with another object by dispensing. The ideal effect of dispensing is neat and beautiful, but in the dispensing process by the conventional dispensing jig, the adhesive will spill, which can be hardly controlled, and the spilled adhesive may stick on the dispensing jig and be bonded therewith, which is difficult to separate them.

SUMMARY

In order to solve the problems existing in the related art, the embodiments of the present disclosure provide a dispensing jig to prevent the spilled adhesive from sticking on the dispensing jig.

According to a first aspect of the present disclosure, there is provided a dispensing jig. The dispensing jig includes a jig body defining a positioning chamber. The positioning chamber includes an opening and is configured to position a first adhesive surface of a first object. The dispensing jig further includes an anti-sticking layer disposed at least partially on an upper surface of a periphery of the opening and an inner circumferential wall surface of the opening.

According to a second aspect of the present disclosure, a device including a dispensing jig is provided. The dispensing jig includes a jig body defining a positioning chamber. The positioning chamber includes an opening and is configured to position a first adhesive surface of a first object. The dispensing jig further includes an anti-sticking layer disposed at least partially on an upper surface of a periphery of the opening and an inner circumferential wall surface of the opening.

It is to be understood that both the foregoing general description and the following detailed description are exemplary and explanatory only and are not restrictive of the invention claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Throughout the specification and claims, terms may have nuanced meanings suggested or implied in context beyond an explicitly stated meaning. Likewise, the phrase "in one embodiment" "an exemplary embodiment" or "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe an any feature. structure, or characteristic in a singular sense or may be used to describe combinations of features. structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure Instead, they are merely examples of apparatuses and methods consistent with aspects related to the disclosure as recited in the appended claims.

Figure 1:
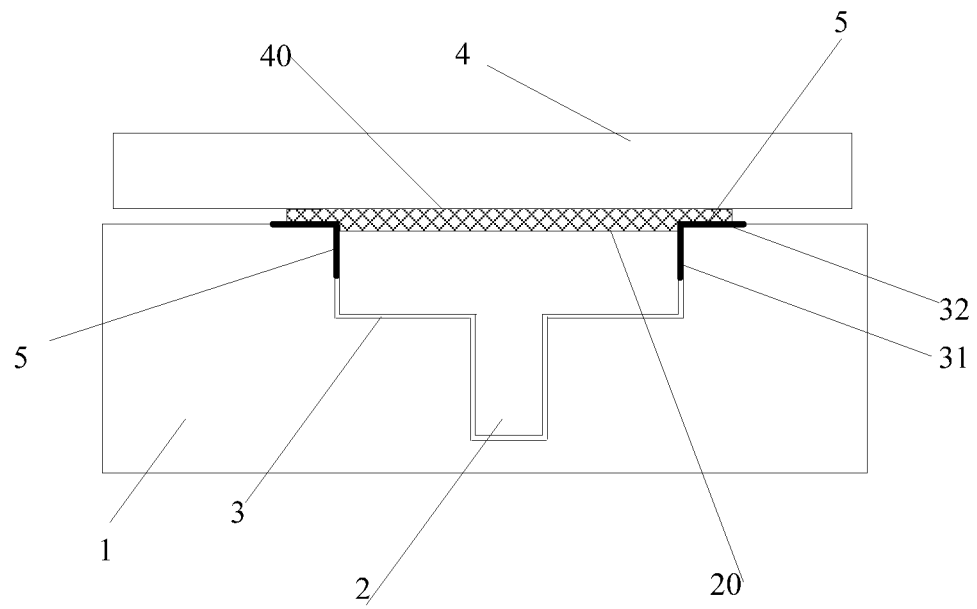
FIG. 1 is a schematic view of a dispensing jig according to an exemplary embodiment.

The embodiments of the present disclosure provide a dispensing jig. As shown in FIG. 1 the dispensing jig includes a jig body 1 defining a positioning chamber 3 which has an opening and is configured to position a first adhesive surface 20 of a first object 2, the first adhesive surface 20 being a surface of the first object 2 to be adhered to a second adhesive surface 40 of a second object 2, in which an anti-sticking layer 5 is provided on each of an upper surface 32 of a periphery of the opening facing the second adhesive surface 40 and an inner circumferential wall surface 31 of the opening. The jib body 1 may be made of metal, alloy, or other types of material. The first object may include a hook, a bezel, etc. Alternatively or additionally, the first object may include hardware, circuits, or other components to be installed in a smartphone or other electronic devices. The second object may include a housing for a smartphone, a housing for a computing device such as a tablet, a socket, a cover glass of a display, a cover glass of a touch panel, etc. The anti-sticking layer may include anti-fingerprint coating, oleophobic coating, SiF$_4$, etc. The first adhesive surface 20 and second adhesive surface 40 may include a curved portion as long as the distance between the two adhesive surfaces are uniform.

In an embodiment, the anti-sticking layer can be embodied as an anti-sticking coating layer or an anti-sticking plating layer, in which a gap of 0.5 mm may be reduced to 0.2 mm, 0.15 mm or 0.1 mm.

If there is no anti-sticking coating layer, the gap needs to be wide enough to prevent the jig from being bonded with the adhesive; but if the gap is too wide, the adhesive will spill and become irregular. If the jig is provided with the anti-sticking coating layer, the gap may be very small, such that the jig can position and limit the adhesive to make the spilled adhesive well-distributed. If the spilled adhesive needs to surround a bonded object evenly, the jig can be employed in this manner.

Figure 2:
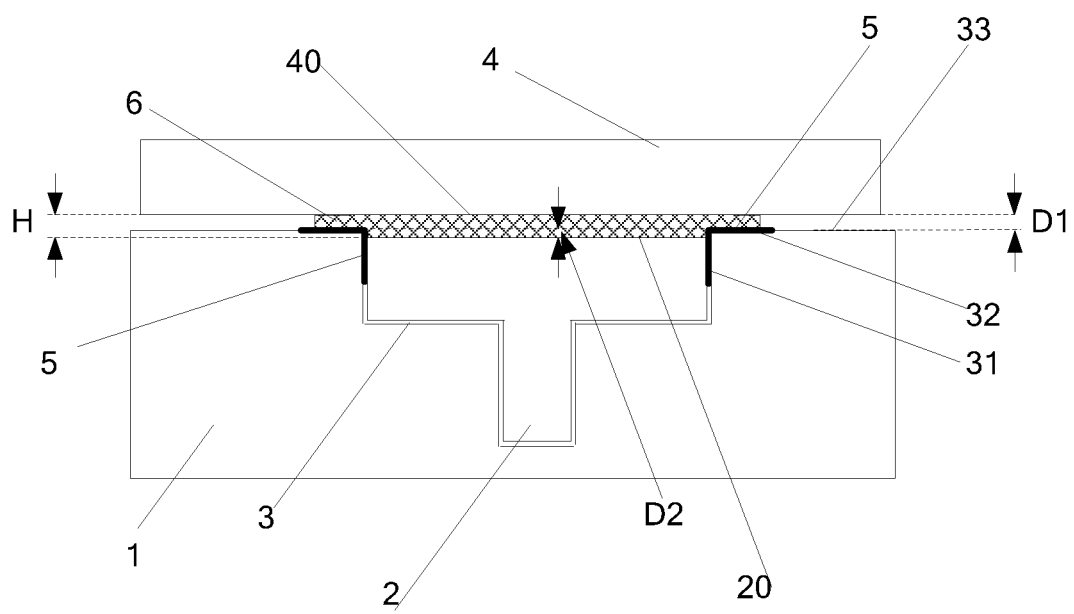
FIG. 2 is a schematic view of a dispensing jig according to an exemplary embodiment.

Referring to FIG. 2, the working principle of the dispensing jig is presented as follows.

The first object 2 is placed in the positioning chamber 3 whose spatial shape is adaptive to the first object 2, so as to retain the position of the first object 2 to fix the position of the first adhesive surface 20 of the first object 2.

An adhesive 6 is applied onto the first adhesive surface 20 of the first object 2. For example, the adhesive may be applied to the surface by using a dispenser machine or glue gun.

The second adhesive surface 40 of the second object 4 is overlaid onto the first adhesive surface 20 coated with the adhesive 6. The first adhesive surface 20 is bonded with the second adhesive surface 40 by proper pressing, and meanwhile, part of the adhesive will spill onto the upper surface 32 and the inner circumferential wall surface 31. Since the upper surface 32 and the inner circumferential wall surface 31 are provided with the anti-sticking layers, the spilled adhesive will not be bonded with the dispensing jig, and it is easy to separate the adhesive from the dispensing jig.

Consequently, as for the dispensing jig according to the embodiments of the present disclosure, the anti-sticking layers are arranged at the position where the spilled adhesive is in contact with the dispensing jig, to avoid the bonding between the spilled adhesive and the dispensing jig, and to facilitate separation of the spilled adhesive from the dispensing jig for the users' convenience.

Figure 3:
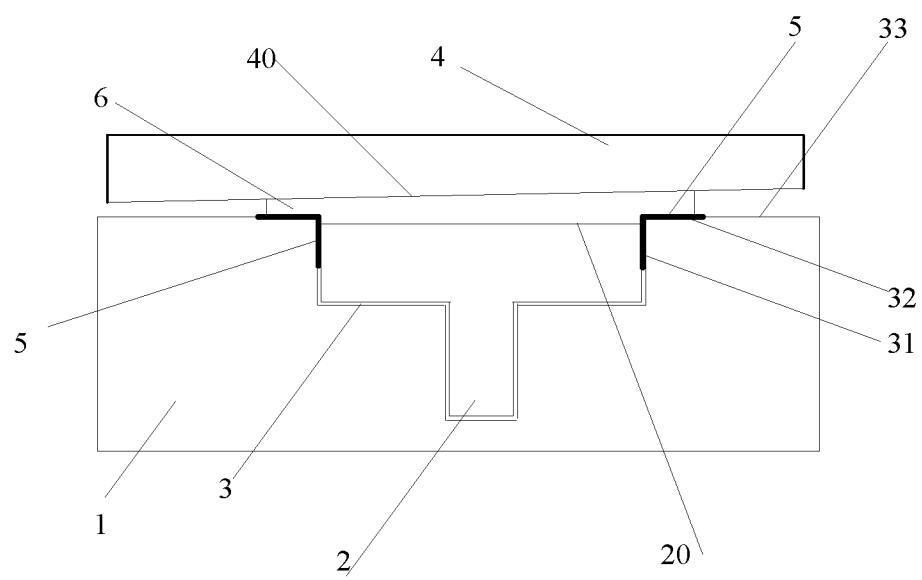
FIG. 3 is a schematic view of another dispensing jig according to an exemplary embodiment.

In an embodiment, as shown in FIG. 2, the plane 33 in which the opening of the positioning chamber 3 is located is parallel to the first adhesive surface 20 and the second adhesive surface 40, such that the spilled adhesives at both sides are equivalent, and the anti-sticking layers can still avoid the bonding between the spilled adhesive and the dispensing jig. Moreover, for some applications, if the first adhesive surface 20 needs to be bonded with the second adhesive surface 40 in a nonparallel manner, i.e. the plane 33 in which the opening of the positioning chamber 3 is located in parallel to the first adhesive surface 20 and nonparallel to the second adhesive surface 40, as shown in FIG. 3, the dispensing jig can still prevent the spilled adhesive at both sides from bonding with the dispensing jig.

In an embodiment, a first distance D1 from the plane 33 in which the opening of the positioning chamber 3 is located to the second adhesive surface 40 is equal to or less than a predetermined value, and an adhesive 6 between the first adhesive surface 20 and the second adhesive surface 40 has a predetermined thickness H. The first distance D1 actually refers to the thickness of the spilled adhesive, i.e. controlling the thickness of the spilled adhesive within the predetermined value, and the predetermined value can be set according to the practical requirements. In practice, the height of the positioning chamber in the dispensing lip, can be designed based on the predetermined thickness and the height of the first object. such that the thickness of the spilled adhesive is equal to or less than the predetermined value to avoid overspill of the adhesive, which may degrade the esthetic effect.

In an embodiment, as shown in FIG. 2, the plane 33 in which the opening of the positioning chamber 3 is located is higher than the first adhesive surface 20 by a second distance D2; the second distance D2 is equal to a difference value between the predetermined thickness H and the first distance D1, such that part of the adhesive is contained within the positioning chamber to control the thickness of the spilled adhesive to be equal to or less than the predetermined value for the users' convenience.

In an embodiment, the predetermined value is equal to or less than 0.5 mm. For example, the predetermined value is equal to 0.2 mm, 0.15 mm, 0.1 mm, or other values within 0.2 mm, so as to guarantee the bonding effect and to reduce the spilled adhesive for aesthetic effect.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A dispensing jig, comprising:
   a jig body defining a positioning chamber comprising an opening configured to position a first adhesive surface of a first object; and
   an anti-sticking layer disposed at least partially on an upper surface of a periphery of the opening and an inner circumferential wall surface of the opening.

2. The dispensing jig according to claim 1, wherein the first adhesive surface is configured to be adhered to a second adhesive surface of a second object, and wherein the opening is located in a plane parallel to the first and second adhesive surfaces.

3. The dispensing jig according to claim 2, wherein a first distance D1 from the plane to the second adhesive surface is equal to or less than a predetermined value, and an adhesive between the first adhesive surface and the second adhesive surface has a predetermined thickness.

4. The dispensing jig according to claim 3, wherein the plane is higher than the first adhesive surface by a second distance; the second distance is equal to a difference value between the predetermined thickness and the first distance.

5. The dispensing jig according to claim 3, wherein the predetermined value is equal to or less than 0.5 mm.

6. The dispensing jig according to claim 5, wherein the predetermined value is equal to 0.2 mm, 0.15 mm or 0.1 mm.

7. The dispensing jig according to claim 1, wherein the anti-sticking layer comprises an anti-sticking coating layer or an anti-sticking plating layer.

8. The dispensing jig according to claim 1, wherein the first object comprises at least one of the following: a hook and a bezel.

9. The dispensing jig according to claim 2, wherein the second object comprises one of the following: a housing, a socket, and a cover glass of a display.

10. The dispensing jig according to claim 1, wherein the anti-stick layer comprises at least one of the following: anti-fingerprint coating, oleophobic coating, and $SiF_4$.

11. A device, comprising:
- a dispensing jig comprising: a jig body and an anti-sticking layer; wherein
- the jig body defines a positioning chamber comprising an opening configured to position a first adhesive surface of a first object; and
- the anti-sticking layer is disposed at least partially on an upper surface of a periphery of the opening and an inner circumferential wall surface of the opening.

12. The device according to claim 11, wherein the first adhesive surface is configured to be adhered to a second adhesive surface of a second object, and wherein the opening is located in a plane parallel to the first and second adhesive surfaces.

13. The device according to claim 12, wherein a first distance D1 from the plane to the second adhesive surface is equal to or less than a predetermined value, and an adhesive between the first adhesive surface and the second adhesive surface has a predetermined thickness.

14. The device according to claim 13, wherein the plane is higher than the first adhesive surface by a second distance; the second distance is equal to a difference value between the predetermined thickness and the first distance.

15. The device according to claim 13, wherein the predetermined value is equal to or less than 0.5 mm.

16. The device according to claim 15, wherein the predetermined value is equal to 0.2 mm, 0.15 mm or 0.1 mm.

17. The device according to claim 11, wherein the anti-sticking layer comprises an anti-sticking coating layer or an anti-sticking plating layer.

18. The device according to claim 11, wherein the first object comprises at least one of the following: a hook and a bezel.

19. The device according to claim 12, wherein the second object comprises one of the following: a housing, a socket, and a cover glass of a display.

20. The device according to claim 11, wherein the anti-stick layer comprises at least one of the following: anti-fingerprint coating, oleophobic coating, and $SiF_4$.

* * * * *